(12) United States Patent
Fradet et al.

(10) Patent No.: US 12,492,992 B2
(45) Date of Patent: Dec. 9, 2025

(54) SPECTROSCOPY DEVICE INCORPORATING A MID-INFRARED LASER

(71) Applicant: California Institute of Technology, Pasadena, CA (US)

(72) Inventors: Mathieu Fradet, Pasadena, CA (US); Ryan M. Briggs, Altadena, CA (US); Kazi M. Islam, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 179 days.

(21) Appl. No.: 18/338,020

(22) Filed: Jun. 20, 2023

(65) Prior Publication Data

US 2023/0408406 A1    Dec. 21, 2023

Related U.S. Application Data

(60) Provisional application No. 63/353,958, filed on Jun. 21, 2022.

(51) Int. Cl.
*G01N 21/39* (2006.01)
*H01S 5/026* (2006.01)
(Continued)

(52) U.S. Cl.
CPC .......... *G01N 21/39* (2013.01); *H01S 5/0268* (2013.01); *H01S 5/1203* (2013.01);
(Continued)

(58) Field of Classification Search
CPC .............. G01N 21/39; G01N 2021/393; G01N 2021/396; H01S 5/0268; H01S 5/1203;
(Continued)

(56) References Cited

U.S. PATENT DOCUMENTS 5,491,341 A * 2/1996 McCaul ............... G02B 6/4207
                                                            250/341.5
5,953,356 A   9/1999 Botez et al.
(Continued)

OTHER PUBLICATIONS

Arbabi et al., "Efficient dielectric metasurface collimating lenses for mid-infrared quantum cascade lasers", Optics Express, vol. 23, No. 26, Dec. 28, 2015, pp. 33310-33317, doi: 10.1364/OE.23.033310.
(Continued)

*Primary Examiner* — Md M Rahman
(74) *Attorney, Agent, or Firm* — KPPB LLP

(57) ABSTRACT

Disclosed herein is a spectroscopy device incorporating a mid-infrared laser. In one particular embodiment a spectroscopy device is provided including: a substrate; a single mode laser positioned on the substrate; a single mode detector positioned opposite to the single mode laser on the substrate. A gap is formed between the single mode laser and the single mode detector and a substance is positioned in the gap. The single mode laser is configured to output a tunable narrow wavelength of radiation towards the detector and when the single mode laser outputs a wavelength of radiation overlapping one of the substance's rotational-vibrational energy levels, the substance at least partially absorbs the radiation. The single mode detector is configured to measure the amount of narrow wavelength radiation that is not absorbed by the substance between the single mode detector and the single mode laser.

23 Claims, 20 Drawing Sheets
(17 of 20 Drawing Sheet(s) Filed in Color)

(51) Int. Cl.
*H01S 5/12* (2021.01)
*H01S 5/34* (2006.01)
*H01S 5/343* (2006.01)

(52) U.S. Cl.
CPC ........ *H01S 5/3401* (2013.01); *H01S 5/34313* (2013.01); *H01S 5/34346* (2013.01); *G01N 2021/393* (2013.01); *G01N 2021/396* (2013.01)

(58) Field of Classification Search
CPC ............... H01S 5/3401; H01S 5/34313; H01S 5/34346; H01S 5/1046; H01S 5/0264; H01S 5/22; H01S 2301/163; H01S 5/1237; H01S 5/3402
USPC ....................................................... 356/437
See application file for complete search history.

(56) References Cited

U.S. PATENT DOCUMENTS

| | | | |
|---|---|---|---|
| 6,204,078 B1 | 3/2001 | Inomoto | |
| 6,326,646 B1 | 12/2001 | Baillargeon et al. | |
| 6,646,975 B1* | 11/2003 | Uchizaki | G11B 7/1353 |
| 7,408,966 B1 | 8/2008 | Botez et al. | |
| 7,656,532 B2* | 2/2010 | Cole | G01N 21/39 |
| | | | 356/435 |
| 7,738,523 B2 | 6/2010 | Hatori et al. | |
| 9,350,138 B2 | 5/2016 | Gubenko et al. | |
| 9,438,011 B2 | 9/2016 | Frez et al. | |
| 9,819,151 B2 | 11/2017 | Santis et al. | |
| 9,933,554 B2 | 4/2018 | Santis et al. | |
| 9,991,677 B2 | 6/2018 | Briggs et al. | |
| 10,020,636 B2 | 7/2018 | Zheng et al. | |
| 11,456,573 B2 | 9/2022 | Briggs et al. | |
| 2002/0031838 A1* | 3/2002 | Meinhart | G01N 21/7703 |
| | | | 436/514 |
| 2004/0037503 A1 | 2/2004 | Hastings et al. | |
| 2007/0248134 A1 | 10/2007 | Hatori et al. | |
| 2008/0159341 A1* | 7/2008 | Patel | H01S 5/141 |
| | | | 372/102 |
| 2008/0203281 A1* | 8/2008 | Sanders | G01N 21/39 |
| | | | 250/227.18 |
| 2012/0106583 A1 | 5/2012 | Watson et al. | |
| 2013/0221223 A1 | 8/2013 | Caneau et al. | |
| 2013/0287054 A1 | 10/2013 | Kwon et al. | |
| 2014/0355637 A1 | 12/2014 | Hashimoto et al. | |
| 2015/0333480 A1 | 11/2015 | Santis et al. | |
| 2015/0333482 A1 | 11/2015 | Briggs | |
| 2016/0049770 A1 | 2/2016 | Frez et al. | |
| 2016/0380407 A1 | 12/2016 | Sysak et al. | |
| 2017/0170631 A1 | 6/2017 | Chimot et al. | |
| 2018/0323580 A1 | 11/2018 | Xie et al. | |
| 2019/0195781 A1* | 6/2019 | Waclawek | G01N 21/171 |
| 2021/0104869 A1 | 4/2021 | Briggs et al. | |

OTHER PUBLICATIONS

Bismuto et al., "High performance, low dissipation quantum cascade lasers across the mid-IR range", Optics Express, vol. 23, No. 5, Mar. 9, 2015, pp. 5477-5484, doi: 10.1364/OE.23.005477.
Briggs et al., "Compact Multi-Channel Infrared Laser Absorption Spectrometer for Spacecraft Fire Safety Monitoring", 46th International Conference on Environmental Systems, Jul. 10-14, 2016, Vienna, Austria, 7 pgs.
Briggs et al., "Low-dissipation 7.4-μm single-mode quantum cascade lasers without epitaxial regrowth", Optic Express, vol. 24, No. 13, Jun. 20, 2016, p. 14589-14595, doi: 10.1364/OE.24.014589.
Briggs et al., "Regrowth-free single-mode quantum cascade lasers with power consumption below 1 W", Applied Physics Letters, vol. 105, No. 14, Oct. 10, 2014, pp. 141117-1-141117-4, doi: 10.1063/1.4898003.
Briggs et al., "Single-mode 2.65 μm InGaAsSb/AlInGaAsSb laterally coupled distributed-feedback diode lasers for atmospheric gas detection", Optics Express, vol. 21, No. 1, Jan. 11, 2013, pp. 1317-1323, doi: 10.1364/OE.21.001317.
Canedy et al., "High-power, narrow-ridge, mid-infrared interband cascade lasers", Journal of Crystal Growth, Apr. 2007, vol. 301-302, pp. 931-934, doi: 10.1016/j.jcrysgro.2006.11.127.
Canedy et al., "High-power, narrow-ridge, mid-infrared interband cascade lasers", Journal of Vacuum Science & Technology B, vol. 26, No. 3, May 2008, pp. 1160-1162, doi: 10.1116/1.2884733.
Choi et al., "Evaluation of coupling Coefficients for Laterally-Coupled Distributed Feedback Lasers", Japanese Journal of Applied Physics, vol. 35, Pt. 1, No. 9R, Sep. 1996, pp. 4654-4659, doi: 10.1143/JJAP.35.4654.
Evans et al., "Buried heterostructure quantum cascade lasers with high continuous-wave wall plug efficiency", Applied Physics Letters, vol. 91, No. 7, Aug. 13, 2007, pp. 071101-1-071101-3, doi: 10.1063/1.2770768.
Faist et al., "Distributed feedback quantum cascade lasers", Applied Physics Letters, vol. 70, No. 20, May 19, 1997, pp. 2670-2672, doi: 10.1063/1.119208.
Farquhar et al., "Atmospheric Influence of Earth's Earliest Sulfur Cycle", Science, vol. 289, No. 5480, Aug. 4, 2000, pp. 756-758, doi: 10.1126/science.289.5480.756.
Forouhar et al., "High-power laterally coupled distributed-feedback GaSb-based diode lasers at 2um wavelength", Applied Physics Letters, vol. 100, No. 3, Jan. 19, 2012, pp. 031107-1-031107-4, doi: 10.1063/1.3678187.
Forouhar et al., "Reliable mid-infrared laterally-coupled distributed-feedback interband cascade layers", Applied Physics Letter, vol. 105, No. 5, Aug. 4, 2014, pp. 051110-1-051110-4, doi: 10.1063/1.4892655.
Gmachl et al., "Continuous-wave and high-power pulsed operation of index-coupled distributed feedback quantum cascade laser at λ 8.5 μm", Applied Physics Letters, vol. 72, No. 12, Mar. 23, 1998, pp. 1430-1432, doi: 10.1063/1.120585.
Golka et al., "Quantum cascade lasers with lateral double-sided distributed feedback grating", Applied Physics Letters, vol. 86, No. 11, Mar. 7, 2005, pp. 111103-1-111103-3, doi: 10.1063/1.1883332.
Gupta et al., "Modal Gain of 2.4-um InGaAsSb-AlGaAsSb Complex-Coupled Distributed-Feedback Lasers", IEEE Photonics Technology Letters, vol. 21, No. 20, Oct. 15, 2009, pp. 1532-1534, doi: 10.1109/LPT.2009.2029244.
Gupta et al., "Single mode 2.4 um InGaAsSb/AlGaAsSb distributed feedback lasers for gas sensing", Applied Physics Letter, vol. 95, No. 4, Jul. 27, 2009, p. 041104-1 - 041104-3, doi: 10.1063/1.3189814.
Hinkov et al., "Singlemode quantum cascade lasers with power dissipation below 1 W", Electronics Letters, vol. 48, No. 11, May 24, 2012, pp. 646-647, doi: 10.1049/el.2012.1204.
Kang et al., "Quantum cascade lasers with Y2O3 insulation layer operating at 8.1 μm", Optics Express, vol. 25, No. 16, Aug. 7, 2017, p. 19561-19567, doi: 10.1364/OE.25.019561.
Keil et al., "Oxide dual Damascene Trench Etch Profile Control", Journal of The Electrochemical Society, vol. 148, No. 7, Jun. 5, 2001, pp. G383-G388, doi: 10.1149/1.1375799.
Kim et al., "Corrugated-sidewall interband cascade lasers with single-mode midwave-infrared emission at room temperature", Applied Physics Letters, vol. 95, No. 3, Dec. 2009, pp. 231103-1-231103-3, doi: 10.1063/1.3272676.
Kim et al., "Mid-infrared distributed-feedback interband cascade lasers with continuous-wave single-mode emission to 80 °C", Applied Physics Letter, vol. 101, No. 6, Aug. 6, 2012, pp. 061104-1-061104-3, doi: 10.1063/1.4744445.
Kosterev et al., "Application of quantum cascade lasers to trace gas analysis", Applied Physics B, vol. 90, Dec. 8, 2007, pp. 165-176, doi: 10.1007/s00340-007-2846-9.
Lehnhardt et al., "Continuous wave single mode operation of GaInAsSb/GaSb quantum well lasers emitting beyond 3 um", Applied Physics Letters, vol. 92, No. 18, May 9, 2008, pp. 183508-1-183508-3, doi: 10.1063/1.2926657.
Liu et al., "Coupled-Resonator Optical Waveguides (CROWs) Based on Tapered Grating-Defect Resonators", Conference on Lasers and

(56) References Cited

OTHER PUBLICATIONS

Electro-Optics 2012, OSA Technical Digest (online) (Optica Publishing Group, 2012), 2012, paper CM3M.3, 2 pgs., doi: 10.1364/CLEO_SI.2012.CM3M.3.

Liu et al., "Designing coupled-resonator optical waveguides based on high-Q tapered grating-defect resonators", Optics Express, vol. 20, No. 8, Apr. 9, 2012, pp. 9249-9263, doi: 10.1364/OE.20.009249.

Lu et al, "Room-temperature continuous wave operation of distributed feedback quantum cascade lasers with watt-level power output", Applied Physics Letters, vol. 97, No. 23, Dec. 6, 2010, p. 231119-1-231119-3, doi: 10.1063/1.3525859.

Lu et al., "2.4 W room temperature continuous wave operation of distributed feedback quantum cascade lasers", Applied Physics Letters, vol. 98, No. 18, May 2, 2011, pp. 181106-1-181106-3, doi: 10.1063/1.3588412.

Myers et al., "Qualification of quantum cascade lasers for space environments", Proceedings SPIE, Sensors for Extreme Harsh Environments, vol. 9113, Jun. 5, 2014, pp. 91130Q-1-91130Q-11, doi: 10.1117/12.2053335.

Salhi et al., "Single-frequency Sb-based distributed-feedback lasers emitting at 2.3 um above room temperature for application in tunable diode laser absorption spectroscopy", Applied Optics, vol. 45, No. 20, Jul. 10, 2006, pp. 4957-4965, doi: 10.1364/ao.45.004957.

Santis, "High-Coherence Hybrid Si/III-V Semiconductor Lasers", California Institute of Technology, Thesis, May 24, 2013, 194 pgs.

Santis et al., "High-coherence semiconductor lasers based on integral high-Q resonators in hybrid Si/III-V platforms", PNAS, vol. 111, No. 8, Feb. 25, 2014, pp. 2879-2884, doi: 10.1073/pnas.1400184111.

Schwarz et al., "Monolithically integrated mid-infrared lab-on-a-chip using plasmonics and quantum cascade structures", Nature Communications, vol. 5, No. 4085, Jun. 6, 2014, 7 pgs., doi: 10.1038/ncomms5085.

Streifer et al., "Coupling Coefficients for Distributed Feedback Single- and Double-Heterostructure Diode Lasers", IEEE Journal of Quantum Electronics, vol. QE-11, No. 11, Nov. 1975, pp. 867-873, doi: 10.1109/JQE.1975.1068539.

Streifer et al., "Effect of External Reflectors on Longitudinal Modes of Distributed Feedback Lasers", IEEE Journal of Quantum Electronics, vol. 11, No. 4, Apr. 1975, pp. 154-161, doi: 10.1109/JQE.1975.1068581.

Streifer et al., "TM-Mode Coupling Coefficients in Guided-Wave Distributed Feedback Lasers", IEEE Journal of Quantum Electronics, vol. QE-12, No. 2, Feb. 1976, pp. 74-78, doi: 10.1109/JQE.1976.1069108.

Vurgaftman et al., "Rebalancing of internally generated carriers for mid- infrared interband cascade lasers with very low power consumption", Nature Communications, vol. 2, No. 585, Dec. 13, 2011, 7 pgs., doi: 10.1038/ncomms1595.

Webster et al., "Isotope Ratios of H, C, and O in CO2 and H2O of the Martian Atmosphere", Science, vol. 341, No. 6143, Jul. 19, 2013, pp. 260-263, doi: 10.1126/science.12379.

Webster et al., "Mars Methane Detection and Variability at Gale Crater", Science, vol. 347, No. 6220, Jan. 23, 2015, pp. 415-417, doi: 10.1126/science.1261713.

Wienold et al., "Lateral distributed-feedback gratings for single-mode, high-power terahertz quantum-cascade lasers", Optics Express, vol. 20, No. 10, May 2012, pp. 11207-11217, doi: 10.1364/OE.20.011207.

Zhang et al., "High-performance uncooled distributed-feedback quantum cascade laser without lateral regrowth", Applied Physics Letters, vol. 100, No. 11, Mar. 13, 2012, pp. 112105-1-112105-4, doi: 10.1063/1.3693425.

\* cited by examiner

SPECTROSCOPY DEVICE INCORPORATING A MID-INFRARED LASER

CROSS-REFERENCE TO RELATED APPLICATIONS

This application claims the benefit of and priority under 35 U.S.C. § 119(e) to U.S. Provisional Patent Application Ser. No. 63/353,958 entitled "Monolithically Integrated Mid-Infrared Laser-Based Gas Spectrometer On-A-Chip," filed Jun. 21, 2022, which is incorporated herein by reference in its entirety for all purposes.

STATEMENT OF FEDERAL SUPPORT

This invention was made with government support under Grant No. 80NMO0018D0004 awarded by NASA (JPL). The government has certain rights in the invention.

FIELD OF THE INVENTION

The present invention generally relates to a laser-based spectrometer and more specifically a mid-infrared laser-based spectrometer.

BACKGROUND

Mid-infrared (IR) tunable laser absorption spectroscopy (TLAS) is a powerful tool for in-situ gas sensing. A dedicated laser can be designed to target a specific wavelength based on its active structure. The emitted wavelength is tuned through laser temperature or injection current. Targeting the mid-IR region may take advantage of the very strong fundamental absorption lines in this wavelength regime for many molecules of practical interest.

While TLAS instruments have shown great sensitivity (sub-part-per-million), current systems utilize complex optical alignment, are often bulky, and include several discrete optical components that drives the overall instrument volume, mass and cost. Further, while the effective pathlength can be several meters long, only the part of the optical mode residing outside of the waveguide can interact with molecules of interest that are present in the environment, thus limiting the minimum detection achievable. Furthermore, long waveguides and/or high-finesse cavities with meter-scale effective optical pathlength are susceptible to spoiling through surface contamination, which can reduce optical throughput to unacceptable levels. Current laser-based gas spectrometers use two approaches for miniaturization: either integration with other waveguiding elements or miniaturization of complex bulk-optics components.

Mid-infrared (IR) tunable laser absorption spectroscopy (TLAS) has been shown to be a powerful tool for in situ gas sensing. A dedicated laser can be designed to target a specific wavelength based on its active structure. The emitted wavelength is tuned through the thermo-optic effect by varying the laser injection current or the heat-sink temperature. Targeting the mid-IR region takes advantage of the relatively strong rotational-vibrational absorption lines in this wavelength regime that exist for many molecules of practical interest, as shown in FIG. 1, and is possible through the recent advancements in various laser technologies. FIG. 1 is a plot of absorption line strength for several molecules of practical interest as a function of wavenumber in the mid-IR region. Line strengths may be obtained from the HITRAN Database. Laser technologies suitable for a certain mid-IR wavelength range are shown above the figure.

While TLAS instruments have shown great sensitivity (sub-part-per-million), current systems include complex optical alignment, are often bulky, and are composed of discrete optical components that drive the overall instrument mass, volume, and cost.

SUMMARY OF THE INVENTION

Various embodiments are directed to a spectroscopy device including: a substrate; a single mode laser positioned on the substrate; a single mode detector positioned opposite to the single mode laser on the substrate, wherein a gap is formed between the single mode laser and the single mode detector and wherein a substance is positioned in the gap, and wherein the single mode laser is configured to output a tunable narrow wavelength of radiation towards the detector, wherein when the single mode laser outputs a wavelength of radiation overlapping one of the substance's rotational-vibrational energy levels, the substance at least partially absorbs the radiation, and wherein the single mode detector is configured to measure the amount of narrow wavelength radiation that is not absorbed by the substance between the single mode detector and the single mode laser.

In some embodiments, the spectroscopy device further includes a processor and memory with programming executable by the processor to correlate the measured radiation with an amount of the substance present.

In some embodiments, the single mode laser includes a single mode distributed-feedback (DFB) waveguide.

In some embodiments, the single mode distributed-feedback (DFB) waveguide includes: a semiconductor active region; and a semiconductor cap stacked on top of the semiconductor active region, wherein semiconductor active region and semiconductor cap form a waveguide, wherein the waveguide includes a grating structure distributed along a sidewall of the waveguide, wherein the grating structure protrudes horizontally out of a side of the waveguide.

In some embodiments, the grating structure includes a tapered grating portion sandwiched between two uniform grating portions, wherein each of the uniform grating portions comprise a plurality of uniform ridges with approximately identical height which laterally protrude from the waveguide, and wherein the tapered grating portion includes a plurality of tapered ridges which gradually increase in height from one end to an apex ridge and gradually decrease in height from the apex to the other end.

In some embodiments, the depth of ridge at the ends of the plurality of tapered ridges equals the depth of the uniform ridges.

In some embodiments, the uniform grating portions and the tapered grating portion comprises an approximately uniform grating period between the sections.

In some embodiments, the waveguide comprises another grating structure on an opposing sidewall to the sidewall which mirrors the grating structure.

In some embodiments, the waveguide comprises a surface adjacent to the sidewall including the grating structure comprising a mirrored surface, wherein the width of the mirrored surface is positioned at approximately the maximum width of the quantum cascade stack within the uniform grating portion or is positioned at approximately the minimum width of the waveguide within one of the uniform grating portions.

In some embodiments, the mirrored surface is positioned at the lowest depth portion of the grating structure within one of the uniform grating portions or is positioned at the highest depth portion of the grating structure within one of the uniform grating portions.

In some embodiments, the waveguide includes a quantum well structure.

In some embodiments, a surface adjacent to the sidewall including the grating structure includes a first mirrored surface and wherein another surface adjacent to the sidewall including the grating structure and opposite to the first mirrored surface comprises a second mirrored surface.

In some embodiments, each ridge within the grating structure include gradually increasing followed by gradually decreasing depth portions.

In some embodiments, the semiconductor active region includes InGaAs quantum wells and AlInAs barriers.

In some embodiments, the ridges and a body portion of the waveguide share a substantially uniform thickness.

In some embodiments, the single mode laser includes a single mode DFB laser including: a semiconductor substrate with the single mode DFB waveguide positioned on the semiconductor substrate; a dielectric layer positioned on a surface of the semiconductor substrate and positioned conformally on the grating structure; a metal layer contacting a portion of a top surface of the semiconductor cap.

In some embodiments, the semiconductor cap and the semiconductor substrate include a same semiconductor material.

In some embodiments, the semiconductor cap and the semiconductor substrate further include an n-type or p-type semiconductor material.

In some embodiments, the semiconductor cap and the semiconductor substrate further include a compound semiconductor material.

In some embodiments, the detector includes a single mode distributed-feedback (DFB) waveguide including: a semiconductor active region; and a semiconductor cap stacked on top of the semiconductor active region, wherein semiconductor active region and semiconductor cap form a waveguide.

In some embodiments, the waveguide includes a grating structure distributed along a sidewall of the waveguide, wherein the grating structure protrudes horizontally out of a side of the waveguide.

In some embodiments, the waveguide includes another grating structure on an opposing sidewall to the sidewall which mirrors the grating structure.

In some embodiments, the substance between the single mode detector and the single mode laser includes CO, $CO_2$, OCS, and/or $H_2O$

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The description and claims will be more fully understood with reference to the following figures and data graphs, which are presented as exemplary embodiments of the invention and should not be construed as a complete recitation of the scope of the invention, wherein:

DETAILED DESCRIPTION

Previous waveguide elements may be fabricated using a different material platform than the laser and detector, which may include heterogeneous integration with demanding alignment tolerances. Typical use of bulk optics can be used at any wavelength region and allows for very long effective pathlengths (meters). This does have very low minimum detection levels, e.g., sub part-per-million (ppm). However, it has been discovered that achieving sub-ppm detection levels may not be always useful, and such systems may include complex optical alignment, may be relatively large, heavy, and may include complex integration. Further, while the effective pathlength can be several meters long, only the part of the optical mode residing outside of the waveguide can interact with molecules of interest that are present in the environment, thus limiting the minimum detection achievable. Long waveguides and/or high-finesse cavities with meter-scale effective optical pathlength may be susceptible to spoiling through surface contamination, which can reduce optical throughput to unacceptable levels. Thus, long waveguide pathlengths may not be advantageous and solutions including robustness of alignment may be more important.

On-chip optical spectrometers have been utilized where the light emitted from a laser is coupled into a waveguide. Various embodiments of the invention include on-chip optical spectrometers where the light emitted from a laser (on- or off-chip) is coupled into a waveguide or optical cavity. In some embodiments, the detector and the laser may be on the same chip. In some embodiments, the detector and the laser may be on different chips. For example, the detector and the laser may be two pick and place chips which may be mounted separated by an air gap. The spectrometers may be utilized for CO detection. Fundamental ro-vibrational absorption lines of CO are present in the 4.75 μm regime where quantum cascade (QC) lasers can be used to emit light. In this wavelength region, a very small pathlength can be used to detect CO on the order of 100 ppm accurately, without interference from water. The absorbance spectra may be calculated using the Hitran Database. In some embodiments, the spectrometer may be utilized for carbon monoxide (CO) detection, carbon dioxide ($CO_2$) detection, carbonyl sulfide (OCS) detection, and/or water ($H_2O$) detection.

Figure 1:
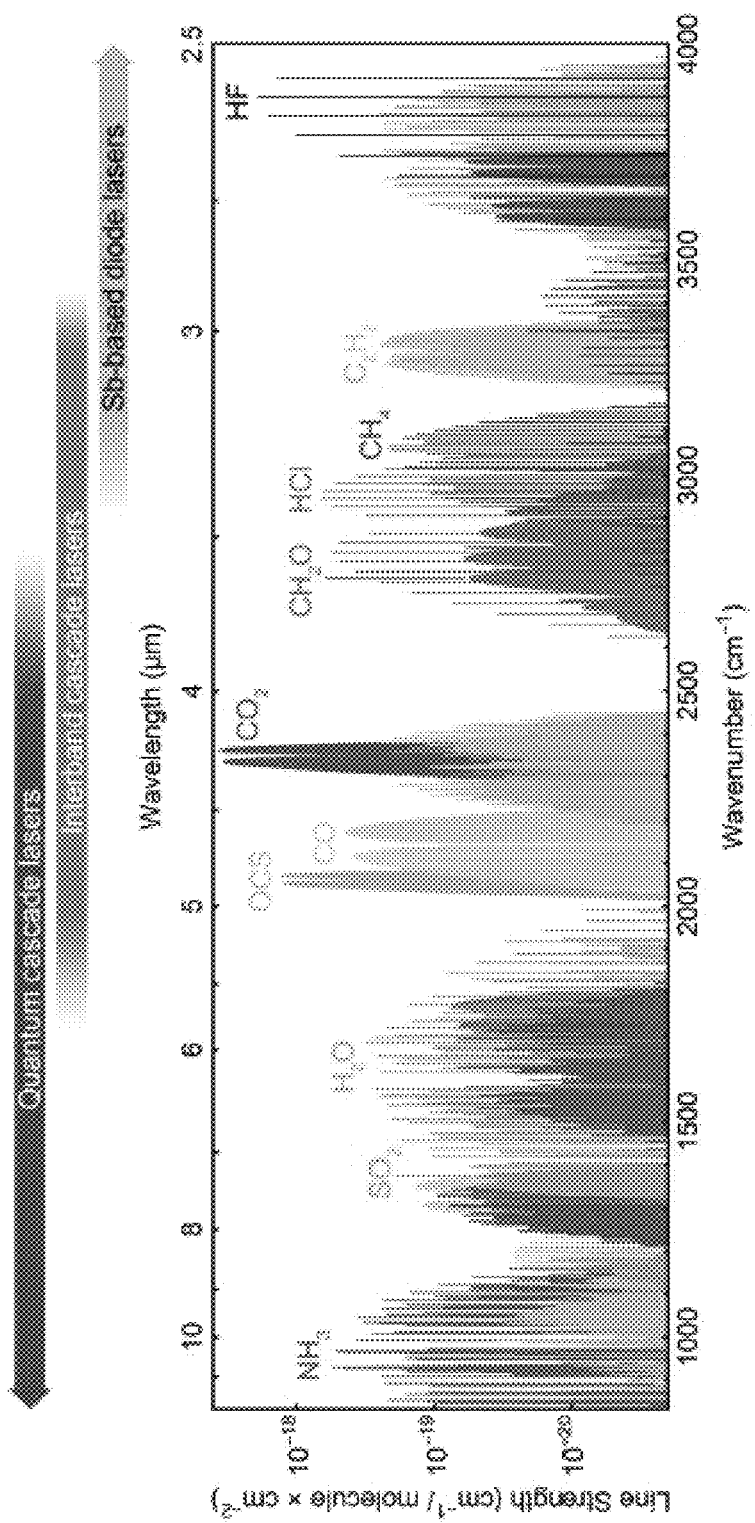
FIG. 1 is a plot of absorption line strength for several molecules of practical interest as a function of wavenumber in the mid-IR region.
Figure 2:
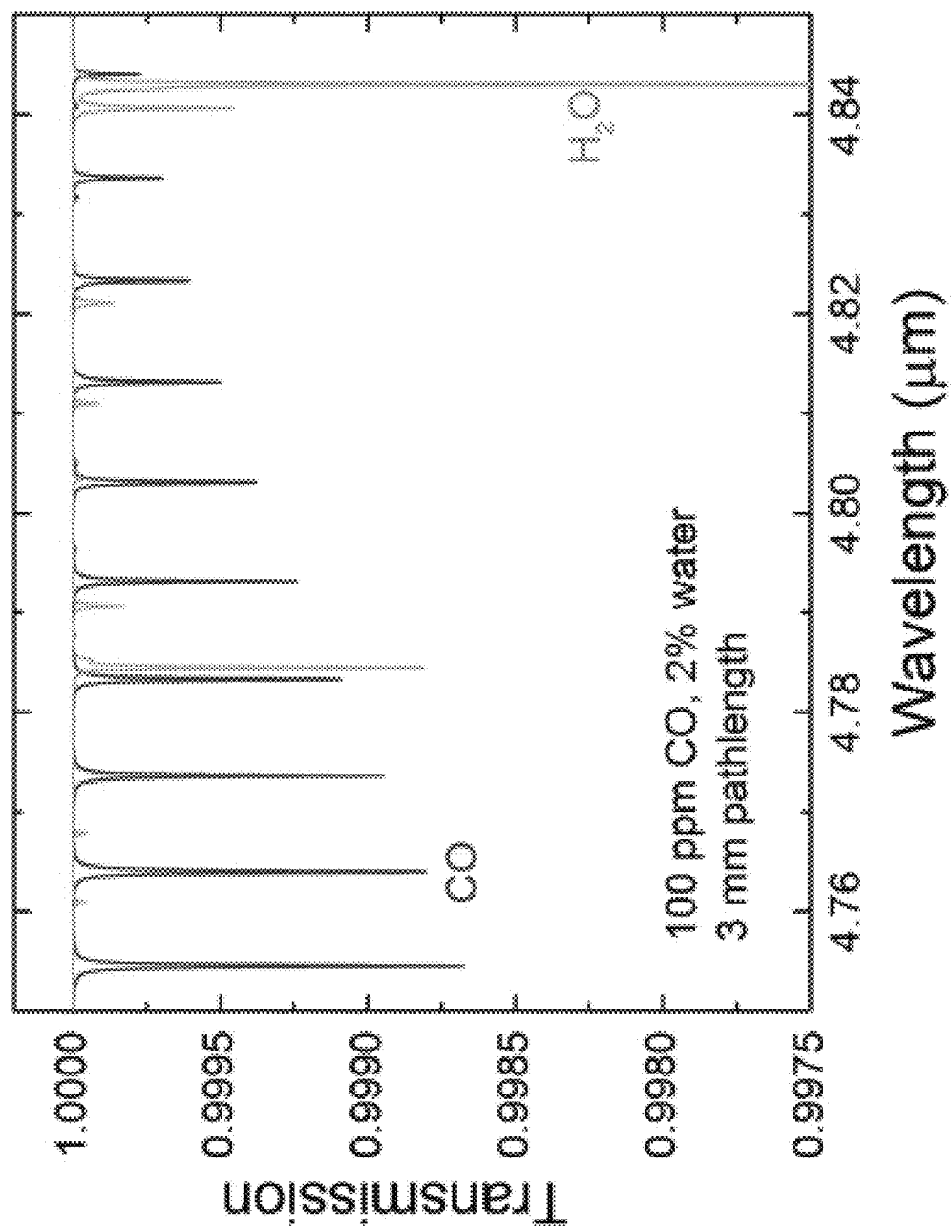
FIG. 2 is a plot illustrating fundamental ro-vibrational absorption lines of CO exist near 4.8 µm wavelength where QC lasers can be used to generate light.

A monolithically integrated quantum cascade (QC) laser and detector was fabricated and is extensible across the mid-IR region (e.g. 3 μm-12 μm) as a miniaturized TLAS instrument. For example, as shown in FIG. 2, <100 ppm(v) of carbon monoxide (CO) can be detected with a relatively short, millimeter-scale pathlength when targeting strong ro-vibrational absorption lines near 4.76 μm, without interference from other common gases such as water vapor. FIG. 2 is a plot illustrating fundamental ro-vibrational absorption lines of CO exist near 4.8 μm wavelength where QC lasers can be used to generate light. In this wavelength region, a small pathlength can be used to detect CO on the order of 100 ppm accurately, without interference from water or other common gases.

Figure 3:
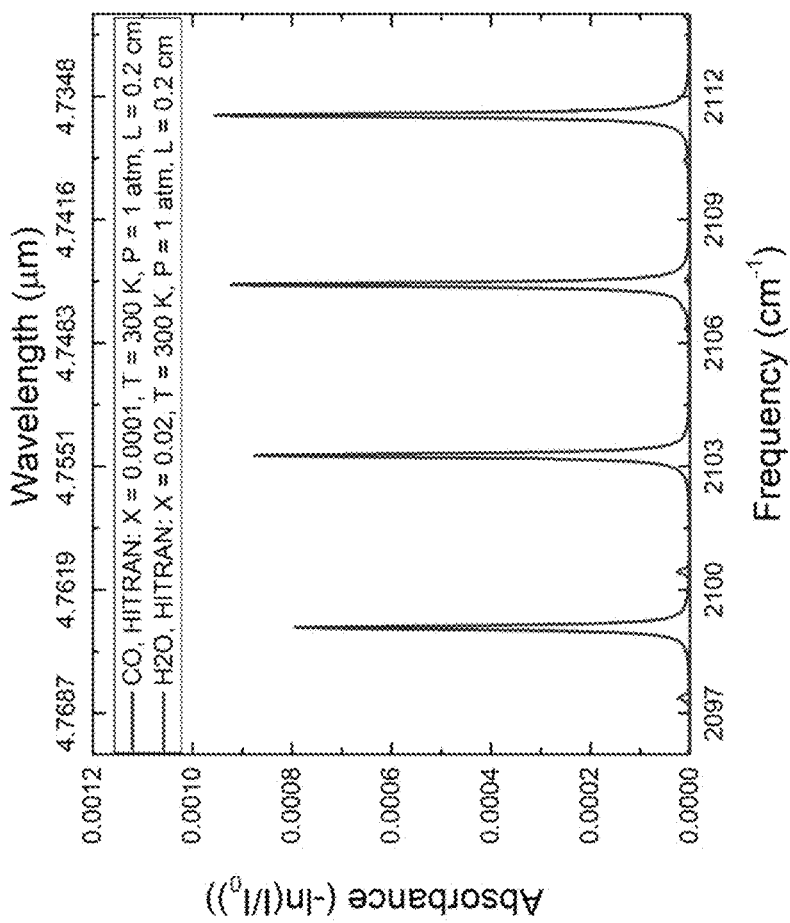
FIG. 3 is a plot of absorbance spectra of 100 ppm CO and 2% water near 4.75 µm using the Hitran Database.

FIG. 3 is a plot of absorbance spectra of 100 ppm CO and 2% water near 4.75 μm using the Hitran Database. Illustrated is the light emission intensity as a function of wavenumber for a QC laser designed for single frequency light emission near 4.75 μm.

Various embodiments include the integration of a distributed-feedback (DFB) quantum cascade (QC) laser onto a chip platform that also includes a QC detector and a plasmonic waveguide. Advantageously, the on-chip DFB QC laser-based gas spectrometer may operation in the mid-infrared wavelength regime, with most of the optical mode propagating through the sample, with minimal weight and volume, and no requirement for optical alignment following chip fabrication.

Using gratings in order to preferentially emit a single wavelength from a QC laser eliminates ambiguous absorption from multiple laser modes and allows for wavelength tuning over a narrow absorption line from a targeted molecule in order to accurately measure its concentration. Thus, the QC laser may include a single mode. The integration of a single frequency QC laser onto an on-chip spectrometer allows for typical tunable laser absorption spectroscopy schemes to be performed on a chip. The optical arrangement eliminates the criticality of the laser alignment within the sensing cavity.

The QC laser is a single mode laser configured to output a narrow wavelength of radiation towards the detector which is at least partially absorbed by the substance between the single mode detector and the single mode laser when the radiation energy (wavelength) overlaps the substance ro-vibrational energy level. As the wavelength is tuned over a scan time, the wavelength will change, so the intensity measured at the detector as compared to the background will increased when the radiation energy overlaps the substance ro-vibrational energy level.

In some embodiments, a quantum cascade (QC) laser and a detector may be monolithically integrated on a single chip that is capable of operating in the mid-IR region (e.g. wavelength 3 μm-12 μm) for detection of molecules that have strong absorption lines in this spectral range.

In some embodiments, the light between the laser and the detector is guided by a dielectric loaded plasmonic waveguide where >90% of the optical mode resides in the environment above the waveguide, enabling useful sensitivity with pathlengths on the order of a millimeter.

All three components (laser, detector, and waveguide) may be fabricated as a single integrated device. In the monolithically integrated laser and detector, the need for optical alignment is removed and the entire optical cavity is reduced to only a few millimeters.

The laser may be a single-mode distributed-feedback (DFB) QC laser capable of continuous-wave operation and allows profiling of single absorption lines of a molecule of interest in the 3 μm-12 μm region. The risk of misalignment of discrete optical components is then eliminated and the mass and volume are greatly reduced.

The monolithically integrated mid-IR laser-based gas spectrometer on-a-chip includes four components: substrate wafer, laser, detector, and waveguide.

All components may be fabricated on a n-InP substrate where the QC active region may be grown by molecular beam epitaxy (MBE). The active region of the laser emits at a wavelength that is defined by the target molecule with consideration for interference from other molecules that may be present. The QC active region of the detector absorbs at the laser emission wavelength. The QC active region of the detector may include independent applied electrical bias.

Figure 5A:
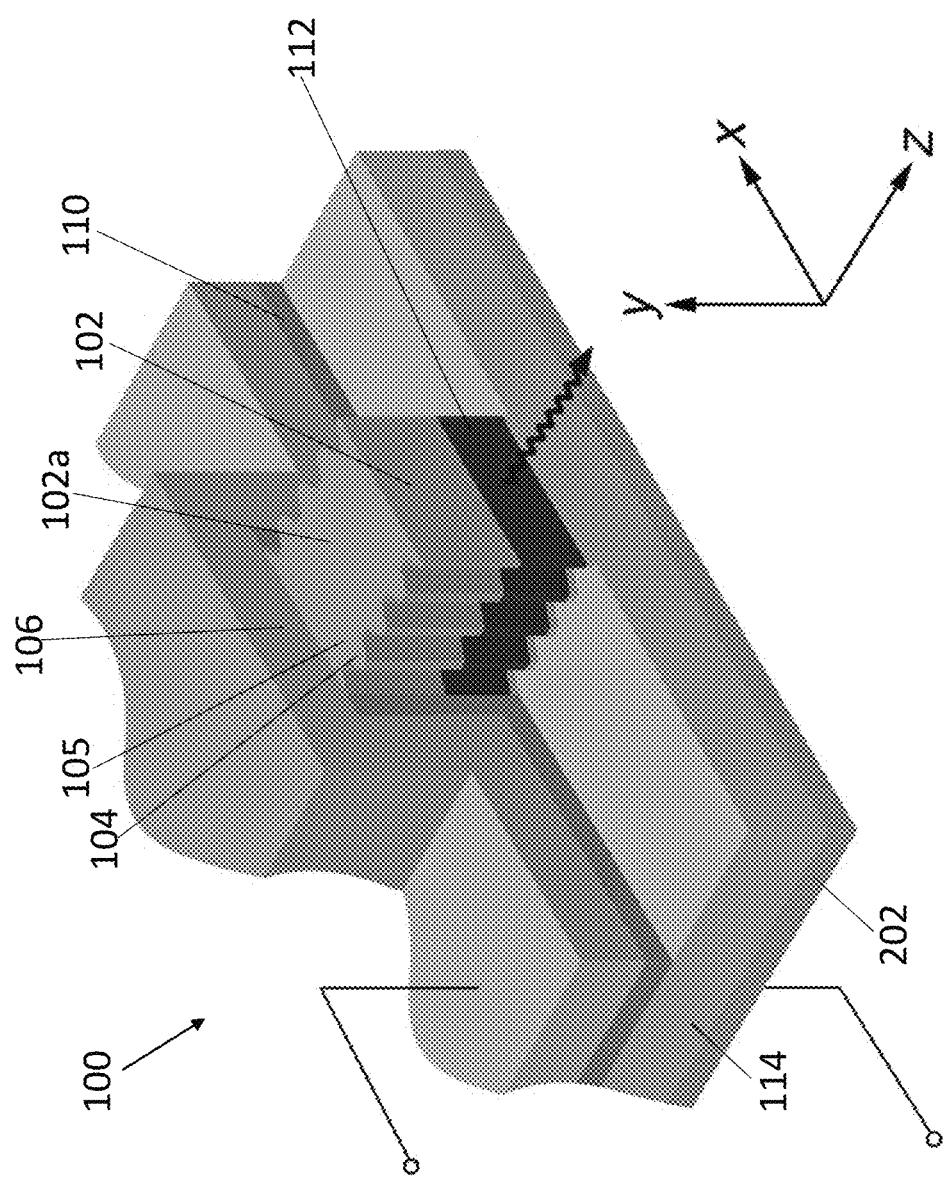
FIGS. 5A-5C illustrate a detailed schematic and scanning electron microscope (SEM) image of the DFB QC laser structure with etched sidewall gratings where the pitch of the grating determines the wavelength selection.
Figure 5B:
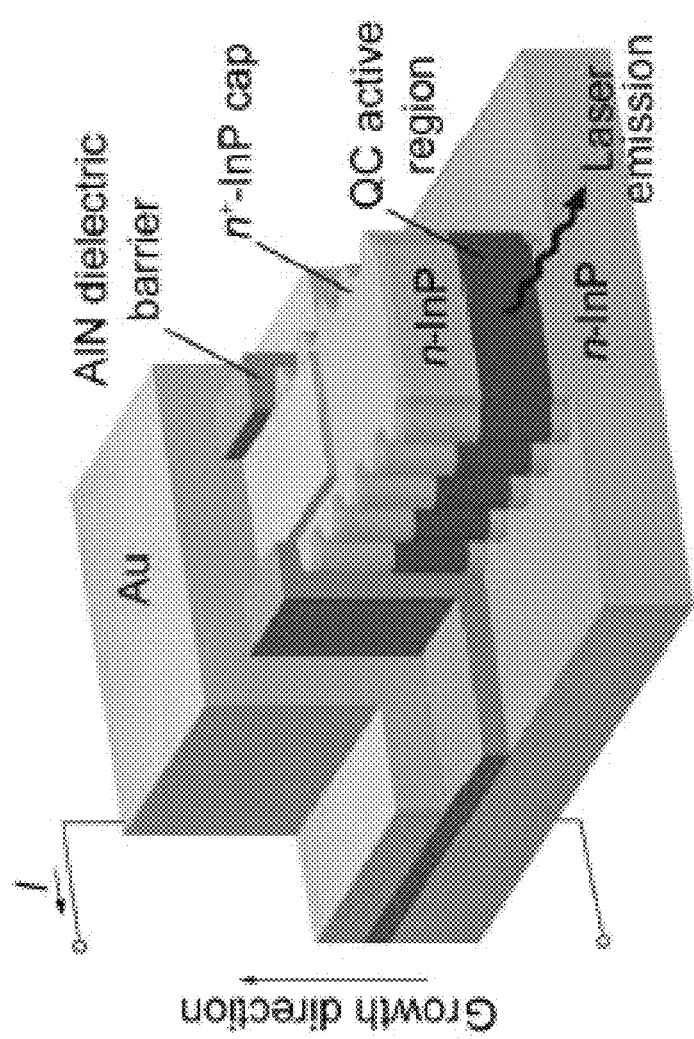

The laser structure may include a narrow ridge waveguide (e.g. ~5 μm) distributed feedback (DFB) quantum cascade (QC) laser capable of emitting a single frequency with side-mode suppression of at least 20 dB. The wavelength and output optical power can be tuned by varying the laser injection current. The DFB QC laser may include one or more DFB gratings or one or more DFB oscillators. Various embodiments of the DFB gratings may be formed as a buried heterostructure or as sidewall gratings etched through the active region, as shown in FIGS. 5A and 5B. An example of a DFB laser including a DFB grating is described in U.S. Pat. Pub. No. 2016/0049770, entitled "Single-mode, distributed feedback interband cascade lasers" and filed Aug. 12, 2015, which is hereby incorporated by reference in its entirety for all purposes. Further, another example of a DFB laser including a DFB oscillator is described in U.S. Pat. Pub. No. 2015/0333480, entitled "High-coherence semiconductor light sources" and filed Jun. 30, 2014, which is hereby incorporated by reference in its entirety for all purposes. Further, an example of a DFB QC laser including one or more DFB gratings including sidewall gratings is described in U.S. Pat. Pub. No. 2021/0104869, entitled "Tapered-Grating Single Mode Lasers and Method of Manufacturing" and filed Oct. 1, 2020, which is hereby incorporated by reference in its entirety for all purposes.

The sidewall grating structure may allow for a regrowth-free fabrication process. The detector is very similar to the laser as they share the same active structure but the detector may or may not include a DFB grating. It has been discovered that in fact a detector not including a DFB grating may provide better performance. The detector is electrically separated from the laser and can be biased independently.

The electric field may be perpendicular to the waveguide in order to be coupled efficiently. An optical mode generated from an InP-based QC laser has transverse magnetic (TM) polarization, thus satisfying the electrical field requirement for coupling to the plasmonic waveguide.

The separation length between the laser and the detector determines the pathlength for absorption measurements, and can be designed to maximize the interaction between the optical mode and gas molecules while minimizing optical losses. The plasmonic waveguide may include a wide gold layer deposited in this separation region followed by a thin and narrow dielectric layer. This structure forms a dielectric-loaded surface plasmon waveguide where the optical mode is guided between the laser and detector with an evanescent decay outside of the dielectric layer leading to >90% of the optical mode present in the medium of interest (e.g. air).

A cavity between the laser and the detector is formed when these devices are fabricated, exposing the edge facets. In some embodiments, a dielectric-loaded surface plasmon waveguide may be included between the laser and the detector. A dielectric-loaded surface plasmon waveguide is described in B. Schwarz, et al., "Monolithically integrated midinfrared lab-on-a-chip using plasmonics and quantum cascade structures," Nature Communications 5, 4085 (2014) which is hereby incorporated by reference in its entirety.

However, it has been discovered that the dielectric-loaded surface plasmon waveguide may not be necessary and that free-space between the laser and the detector may be desirable. Thus, various embodiments of the invention may include free-space between the laser and the detector.

Figure 4:
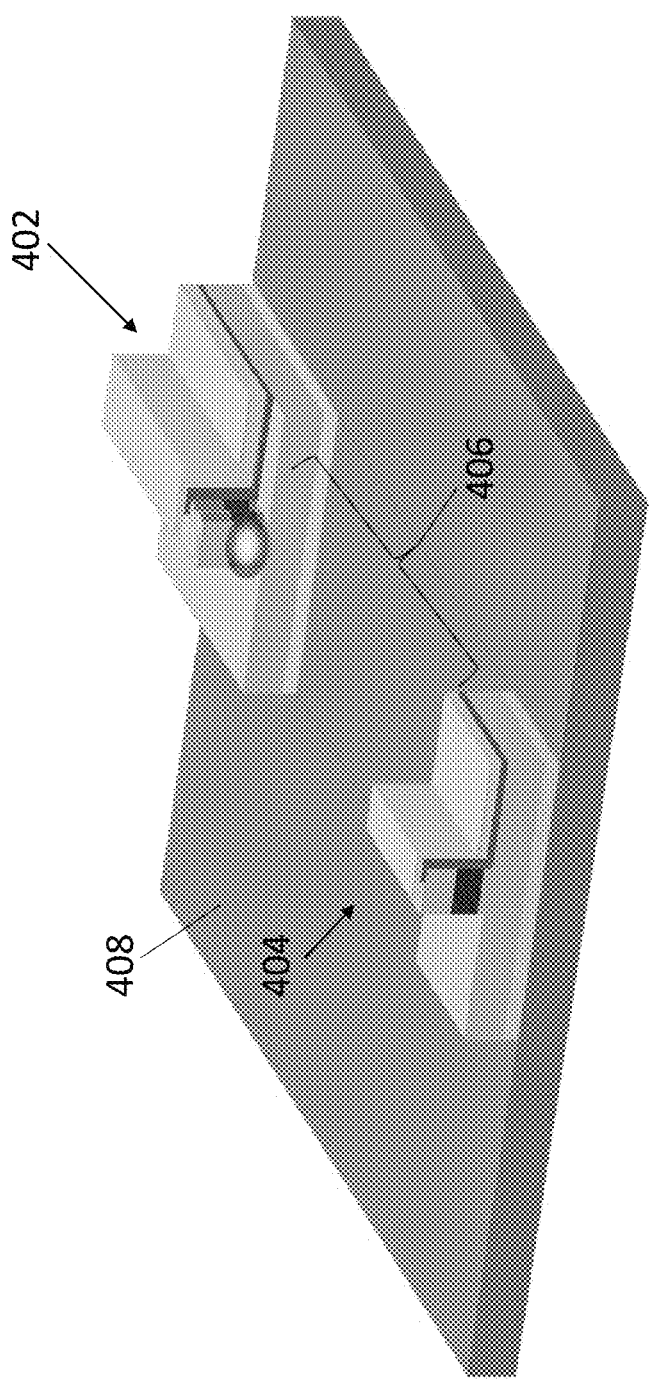
FIG. 4 illustrates an example spectroscopy device in accordance with an embodiment of the invention.

FIG. 4 illustrates an example spectroscopy device in accordance with an embodiment of the invention. The spectroscopy device includes a laser 402 and detector 404 integrated on a substrate 408. An air gap 406 may be positioned between the detector 404 and the laser 402 such that the laser 402 outputs a wavelength of radiation overlapping one of a substance in the air gap's rotational-vibrational energy levels. The substance at least partially absorbs the radiation. The detector 404 is configured to measure the amount of narrow wavelength radiation that is not absorbed by the substance between the detector 404 and the laser 402. Examples of the laser 402 are described below in connection with FIGS. 5A-5C. Examples of the detector 404 are described below. The detector 404 may be very similar to the laser 402 as they share the same active structure but the detector 404 may or may not include a DFB grating as discussed below.

Examples of Substrate Wafers

As mentioned above, the substrate may be a doped n-InP substrate wafer. The QC active region may be grown using MBE and include multiple stages of AlInAs/InGaAs layers with the relative concentration of these elements and number of stages depending on the targeted wavelength. The active regions may be separated from the highly doped substrate by an intermediate n-InP layer that is only a few micrometers thick.

A symmetric layer is also grown on top of the active region as a confinement layer and for a latticematched n+-InGaAs contact layer.

Examples of Single-Mode Lasers

Various embodiments include a single-mode laser fabricated using first-order DFB lateral corrugations. This allows for the fabrication of a regrowth free device. The ridge waveguide patterns are defined using electron-beam lithography and it is transferred using an anisotropic plasma etching process. This allows for the corrugation to be transferred into the ridge and the device is etched through the lower boundary of the QC active region. A narrow conductive contact stripe is exposed on top of the device while the ridge sidewalls are coated with a thick dielectric cladding layer. A thick gold coating is then deposited on top of the device as contact and can be used to bond electrical wires to inject current for driving the device.

Figure 5C:
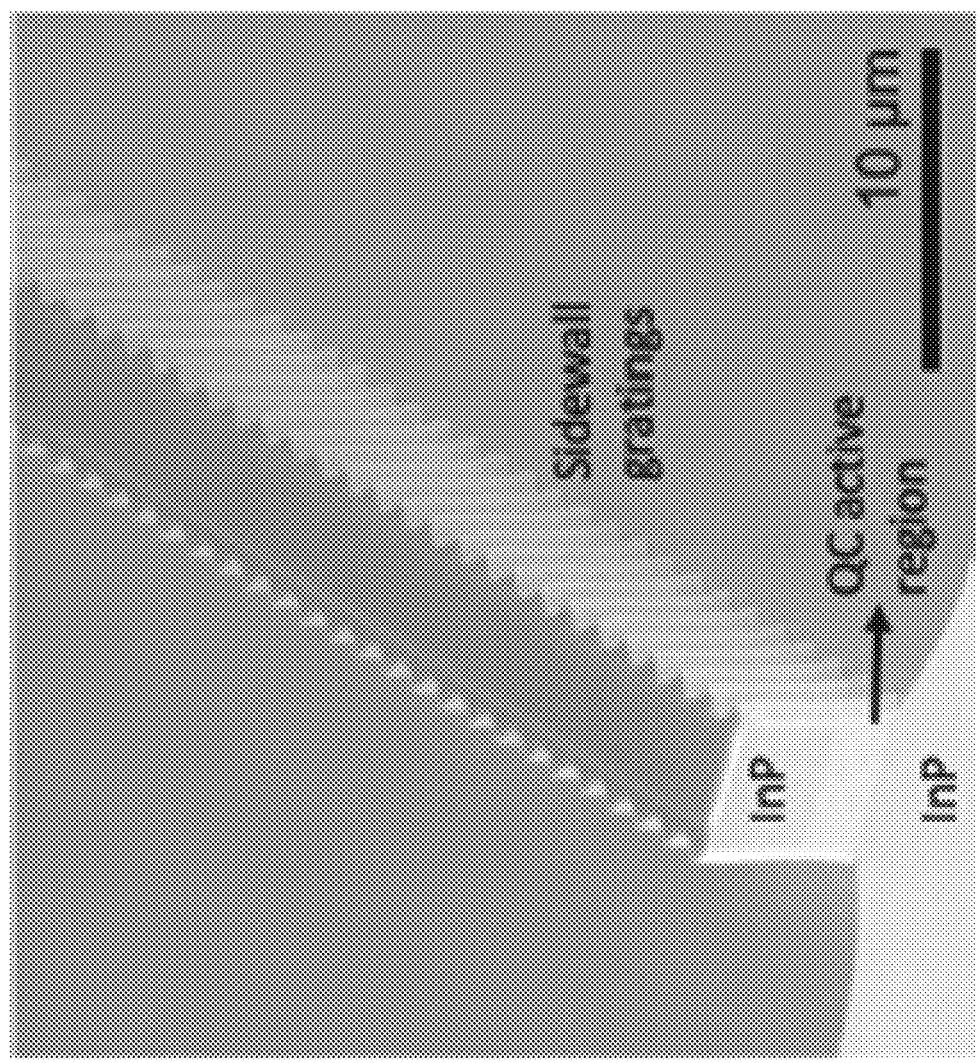

FIGS. 5A-5C illustrate a detailed schematic and scanning electron microscope (SEM) image of the DFB QC laser structure with etched sidewall gratings where the pitch of the grating determines the wavelength selection.

FIG. 5A illustrates an exemplary single mode DFB laser 100 with a single mode DFB waveguide 102. The single mode DFB waveguide 102 includes a semiconductor active region 112 with semiconductor layers above and below the active region 112. The semiconductor active region 112 may be a quantum cascade active region or a quantum well active region. The single mode DFB waveguide 102 includes grating structures 104 in one or both of the sidewalls 105. The grating structures 104 may be tapered gratings as described in U.S. Pat. Pub. No. 2021/0104869. The grating structures 104 may force the single mode DFB waveguide 102 to operating in a predictable single frequency mode which may have many beneficial results.

The layers resulting in optical confinement (waveguiding) and optical gain are positioned on a semiconductor substrate 114. In some embodiments, the gain layers are composed of semiconductor quantum wells. In some embodiments, the gain layers are composed of a quantum cascade stack. A dielectric layer 110 is positioned on a surface of the semiconductor substrate 114 and positioned conformally on the grating structures 104. A metal layer 106 is positioned on a portion of the top surface 102a of the semiconductor cap 102 and conformally positioned on the dielectric layer 110.

In some embodiments, the semiconductor substrate and semiconductor cap may include the same semiconductor material. In some embodiments, the semiconductor substrate and semiconductor cap may include a compound semiconductor material. The semiconductor substrate and semiconductor cap may be InP. In some embodiments, the semiconductor active region 112 may be composed of InGaAs quantum wells with AlInAs barriers. The semiconductor active region 112 may create a quantum well structure that provides both optical gain and vertical waveguide confinement.

In some embodiments, the dielectric barrier material may be a nitride layer (e.g. aluminum nitride or silicon nitride) or an oxide layer (e.g. silicon oxide or yttrium oxide). In some embodiments, the metal layer may be a high conductivity material such as gold. The semiconductor substrate may include a backside contact 202 which may be used in conjunction with the metal layer 106 to generate a current through the single mode DFB waveguide 102.

FIG. 5B illustrates a schematic of a DFB QC laser using sidewall gratings. This DFB QC laser includes similar features to the laser described in connection with FIG. 5A which will be repeated in detail. However, as illustrated, in FIG. 5B, the dielectric layer 110 may form a channel on the surface of the top surface 102a of the semiconductor cap 102. The light-emitting active region is grown using molecular beam epitaxy (MBE) on top of a n-InP substrate followed by growth of the top n-InP layers. After fabrication of the ridge waveguide, a dielectric barrier may be deposited to confine the optical mode laterally, followed by deposition of a gold layer for electrical contacts and heat extraction.

FIG. 5C is an SEM image of an example fabricated semiconductor cap 102 including the grating structures 104 which is described in connection with FIG. 5A or 5B.

Examples of Detectors

The detector and the laser are fabricated on the same substrate. The geometry of the detector may be defined through lithography and a similar process as described above. Electrical wires may be bonded to the detector separately and allows for independent control of the detector and laser. The spacing between the laser and detector may not be protected during the etching of the waveguide ridges process in order to form a separation region for the plasmonic waveguide. The detector is very similar to the laser as they share the same active structure but the detector may or may not include a DFB grating. It has been discovered that in fact a detector not including a DFB grating may provide better performance. The detector is electrically separated from the laser and can be biased independently.

Examples of Waveguides

The distance between the laser and detector is designed to reach our targeted minimal detection level. This area is not protected during the fabrication of the laser and detector, thus is being etched all the way through the lower boundary of the QC active region. In the case of utilizing a plasmonic waveguide, a layer of gold is deposited in the region between the laser and detector facets and a width >10 μm to minimize scattering from metal edges. A thin dielectric layer is then deposited on top of the gold with a width similar to the laser ridge width. This allows lateral confinement of the optical mode while propagating in the separation region. By using a thin dielectric layer, most of the optical mode is located outside of the plasmonic waveguide, allowing for the detection of molecules present in the cavity.

In some embodiments, it has been discovered that the dielectric-loaded surface plasmon waveguide may not be necessary and that free-space between the laser and the detector may be desirable. Thus, various embodiments of the invention may include free-space between the laser and the detector.

Figure 6:
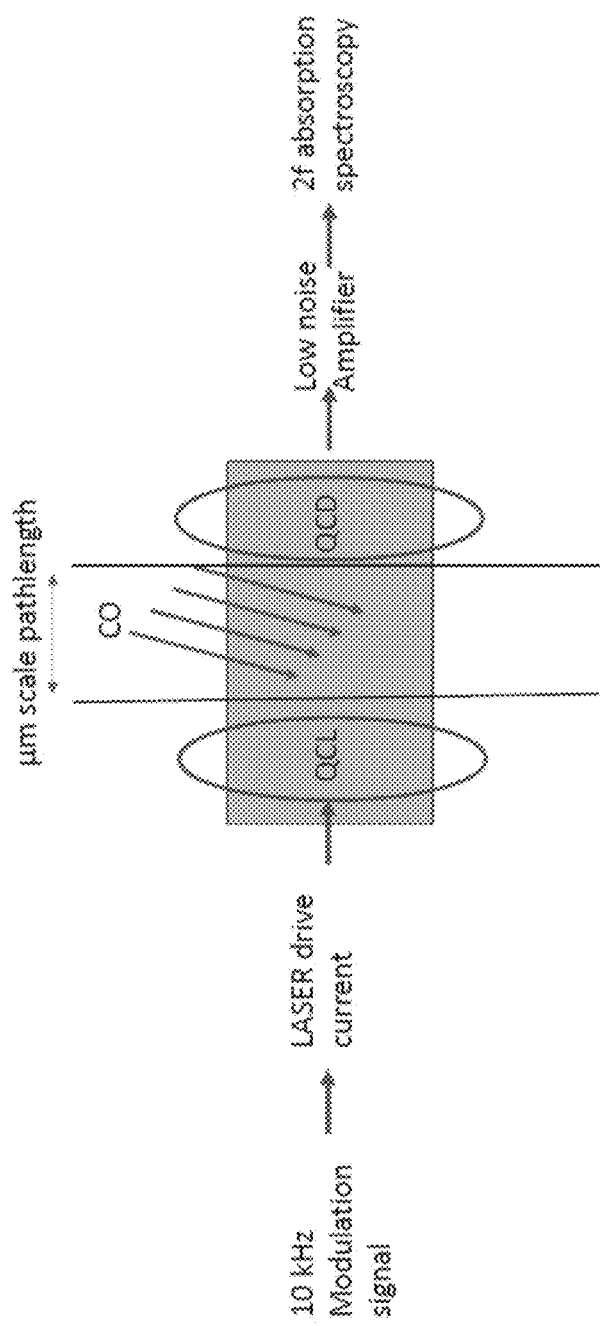
FIG. 6 illustrates a schematic of the on-chip spectrometer in accordance with an embodiment of the invention.

FIG. 6 illustrates a schematic of the on-chip spectrometer in accordance with an embodiment of the invention. The spectrometer is designed using a second-harmonic (2f) absorption spectroscopy method where a sinusoidal current modulation is applied to the laser, at, for example, 5 kHz, in addition to the linear current ramp, and the detector signal is demodulated at twice the modulation frequency.

Figure 7:
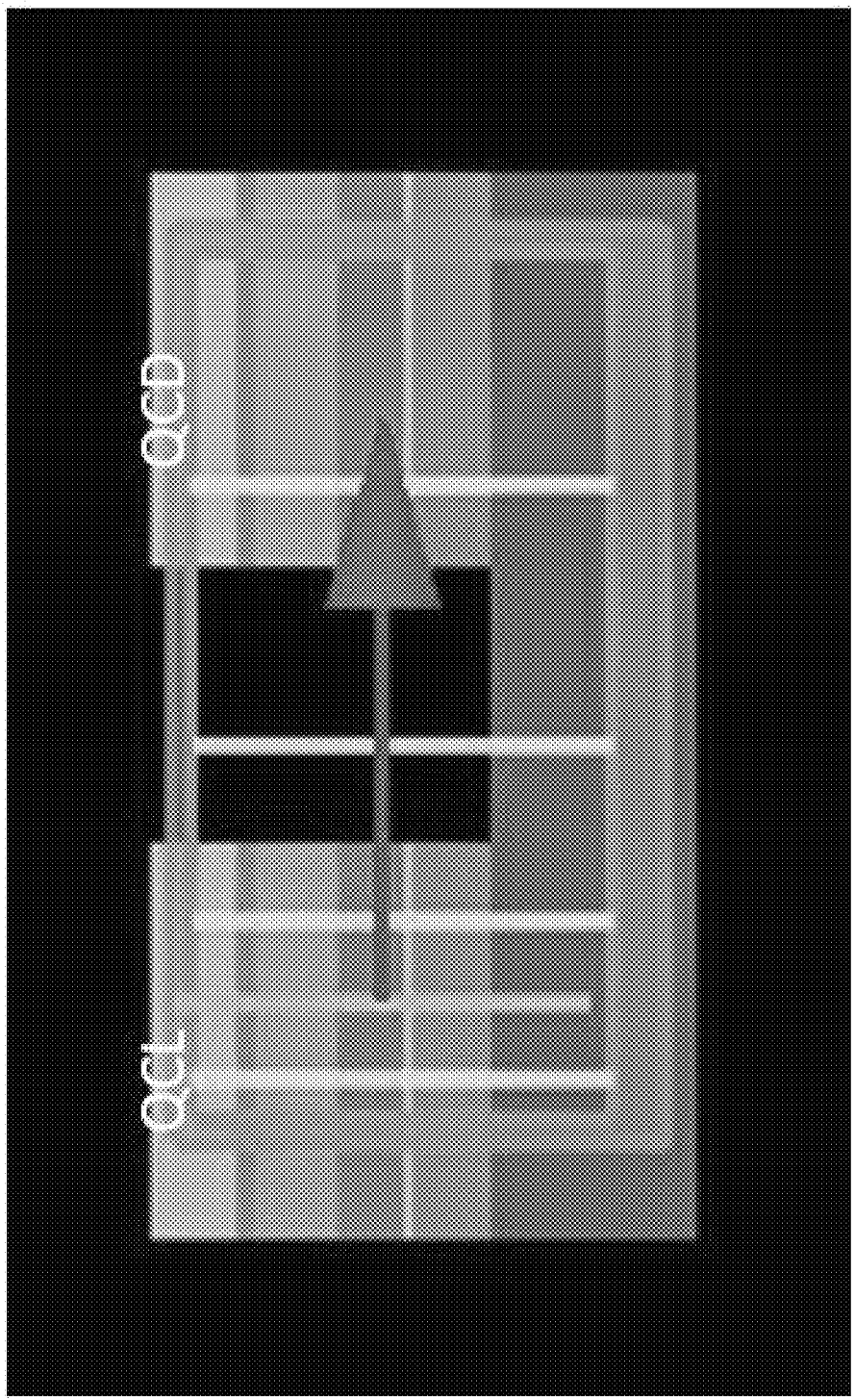
FIG. 7 illustrates a side view schematic of the QC laser (QCL) and QC detector (QCD) used in the Lumerical model.
Figure 8A:
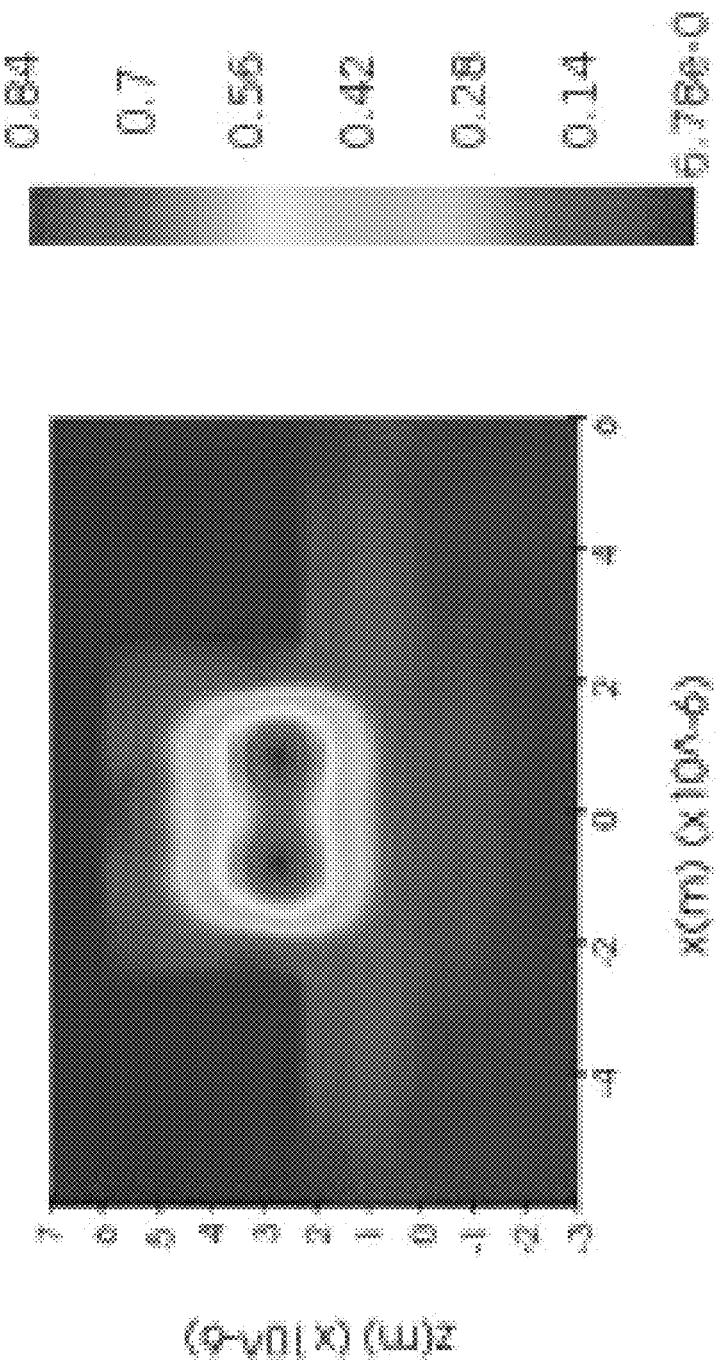
FIGS. 8A-8C illustrate various field profiles across the transmission path.
Figure 8B:
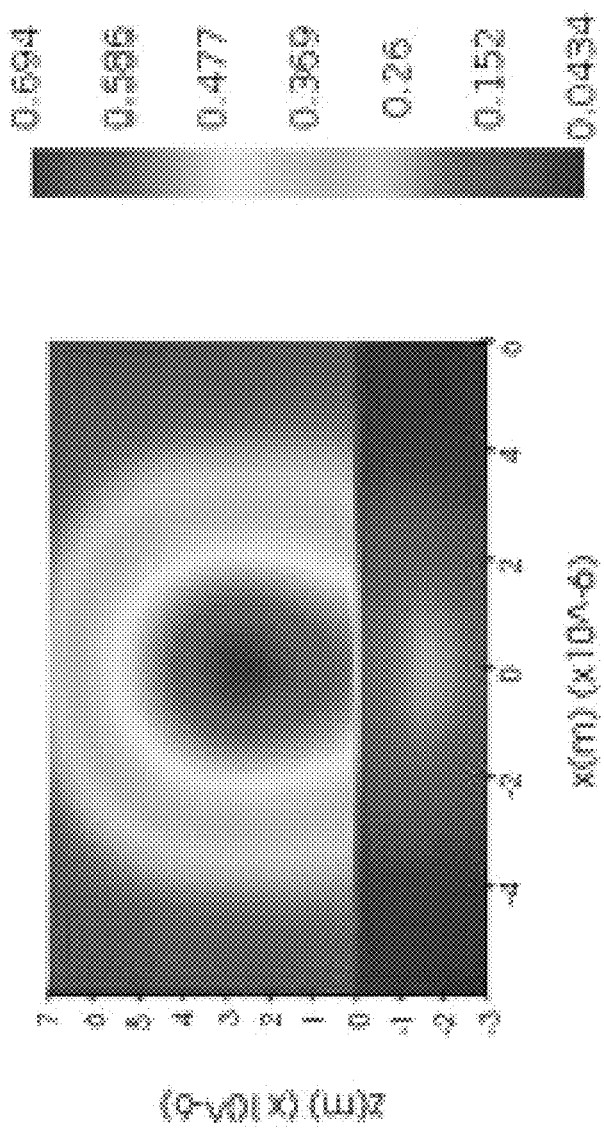
Figure 8C:
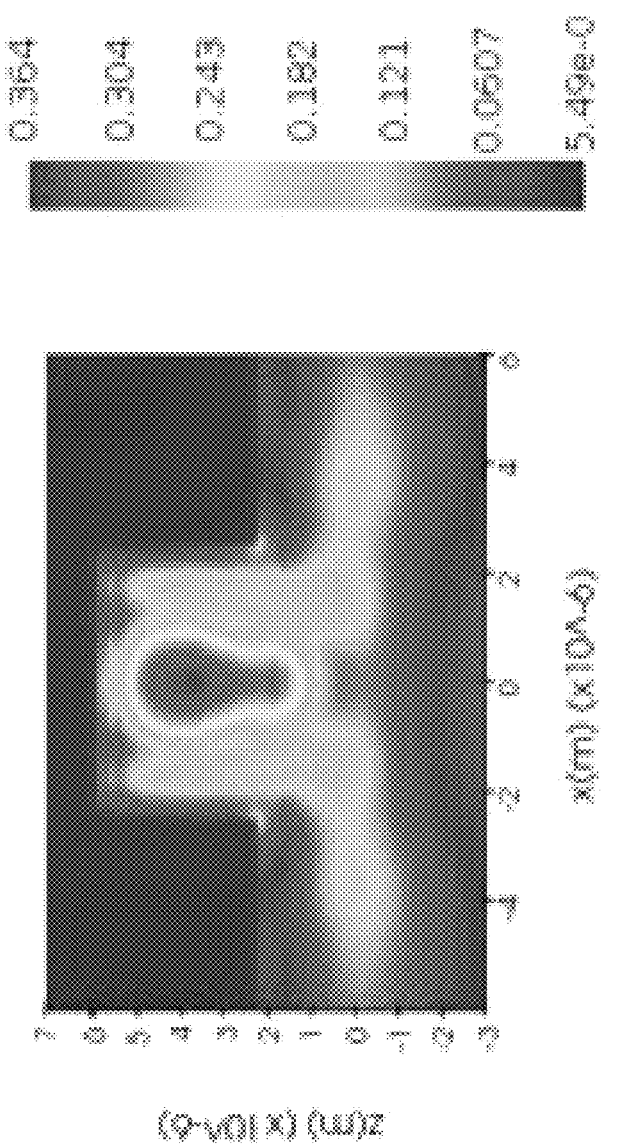
Figure 9:
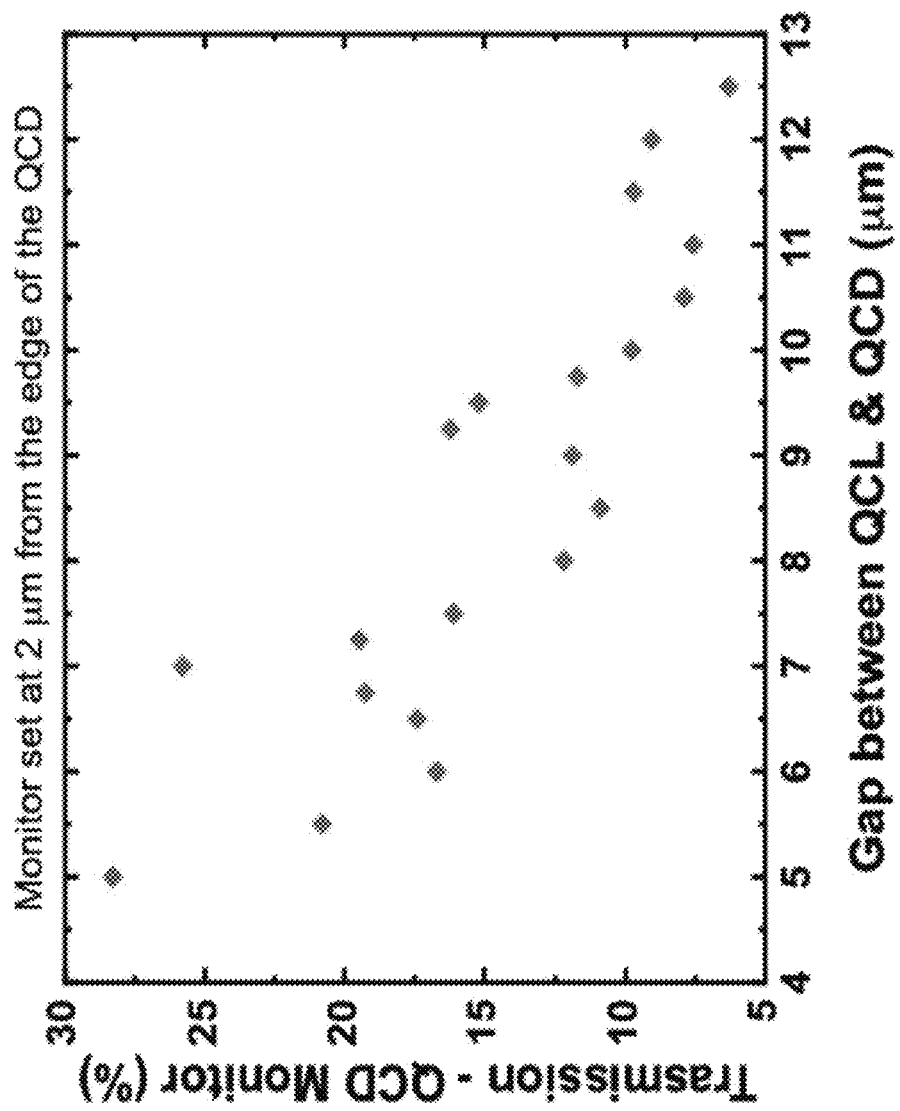
FIG. 9 is the calculated light transmission percentage reaching the detector as a function of the gap between the QCL and QCD.

Lumerical modeling was utilized for the QC laser and QC detector separated by a micron-scale gap and free-space coupling. FIG. 7 illustrates a side view schematic of the QC laser (QCL) and QC detector (QCD) used in the Lumerical model. FIGS. 8A-8C various illustrate field profiles across the transmission path from the QC laser and the QC detector. FIG. 8A illustrates the field profile across the laser. FIG. 8B illustrates the field profile across the midgap between the laser and the detector. FIG. 8C illustrates the field profile across the detector. FIG. 9 is a plot of the calculated light transmission percentage reaching the detector as a function of the gap between the QCL and QCD. The function may be from a Lumerical model.

Figure 10A:
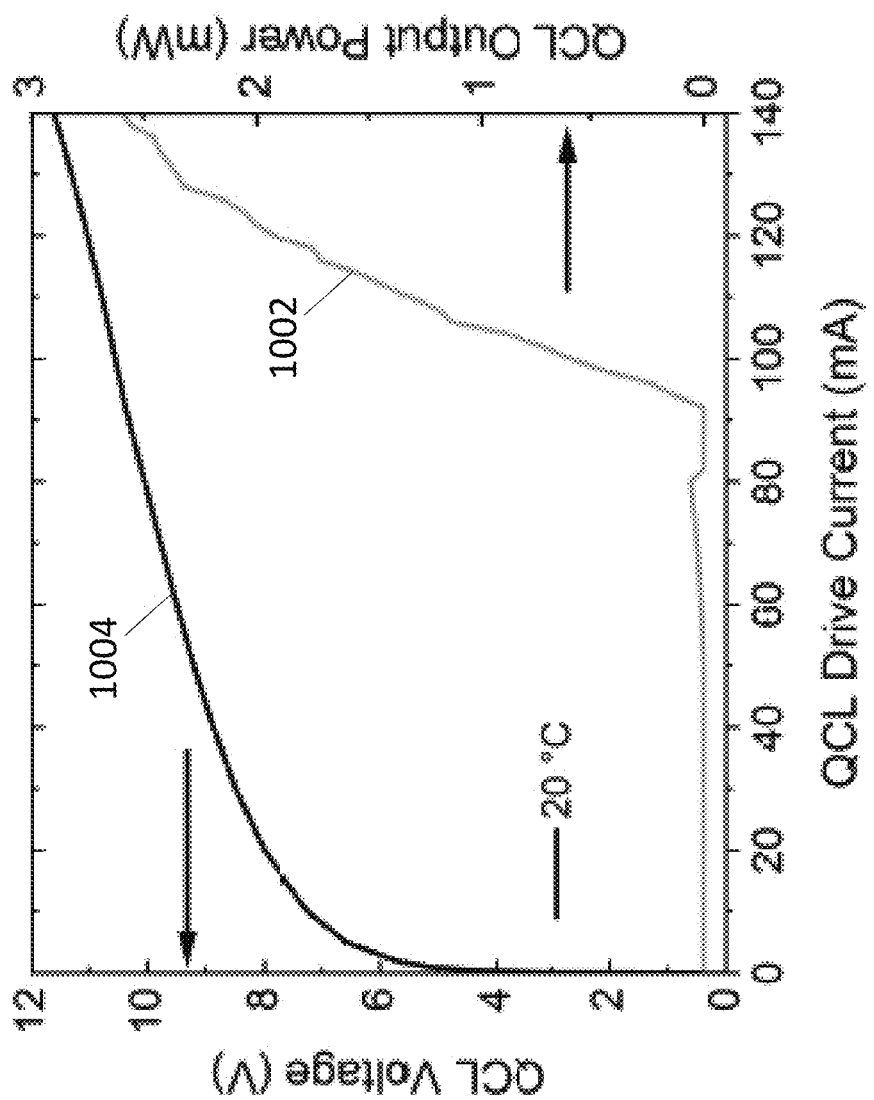
FIG. 10A illustrates an optical output power and QC laser voltage drop as a function of the drive current for a temperature of 20° C.
Figure 10B:
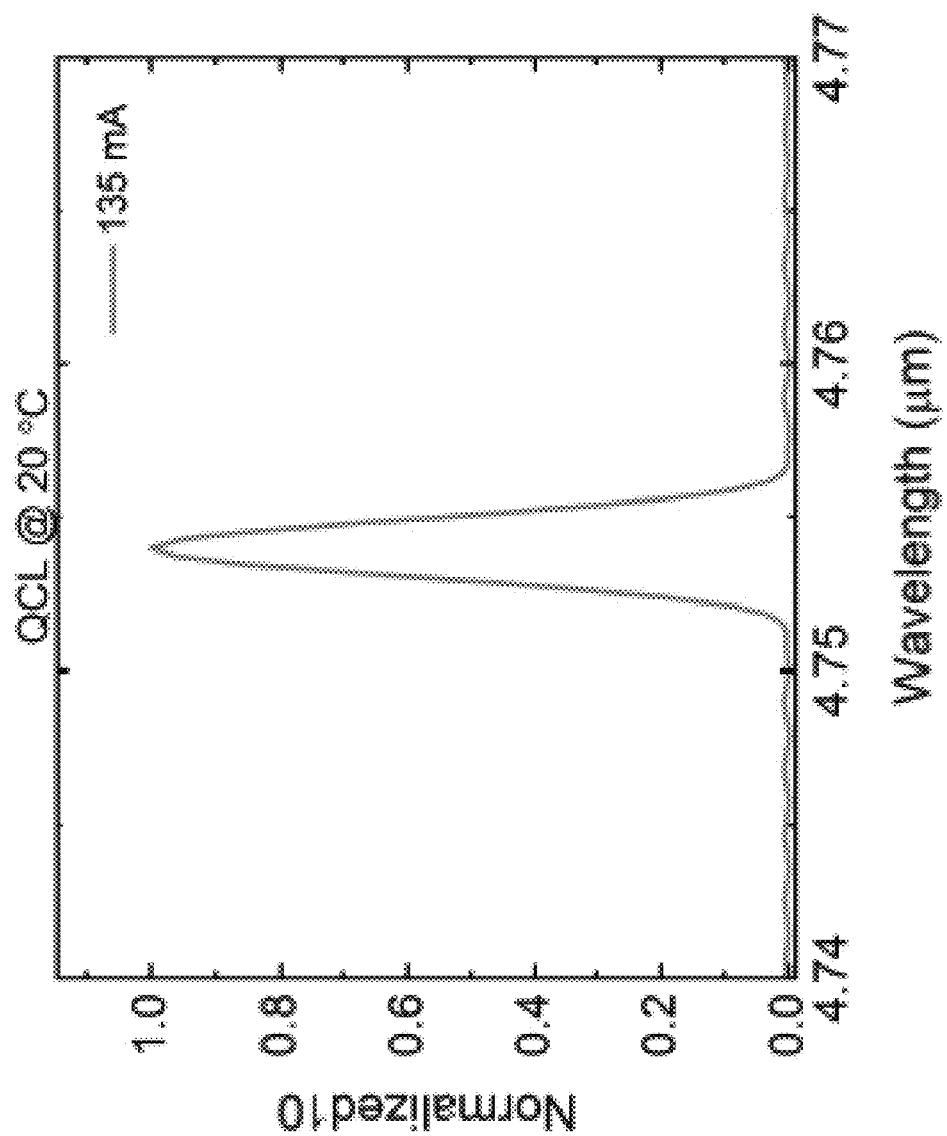
FIG. 10B illustrates a normalized light intensity as a function of wavelength acquired using Fourier transform infrared (FTIR) spectroscopy.
Figure 10C:
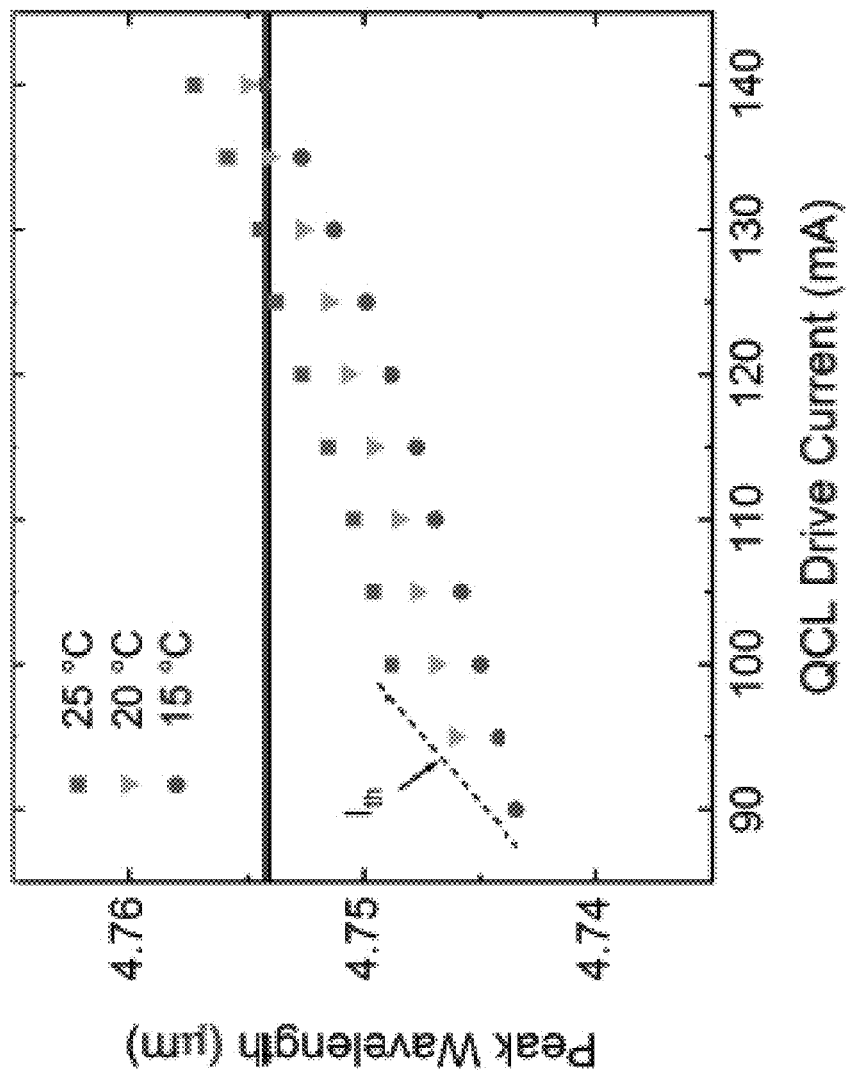
FIG. 10C illustrates peak lasing wavelength as a function of drive current and temperature.

As described previously, the spectroscopy system including the QC laser may be utilized for CO detection. FIG. 10A illustrates an optical output power 1002 and QC laser voltage drop 1004 as a function of the drive current for a temperature of 20° C. FIG. 10B illustrates a normalized light intensity as a function of wavelength acquired using Fourier transform infrared (FTIR) spectroscopy. The QC laser current was 135 mA and the temperature was 20° C. FIG. 10C illustrates peak lasing wavelength as a function of drive current and temperature. The horizontal line represents of CO absorption line. This QC laser can target the CO line at a drive current of 135 mA and 20° C.

Figure 11:
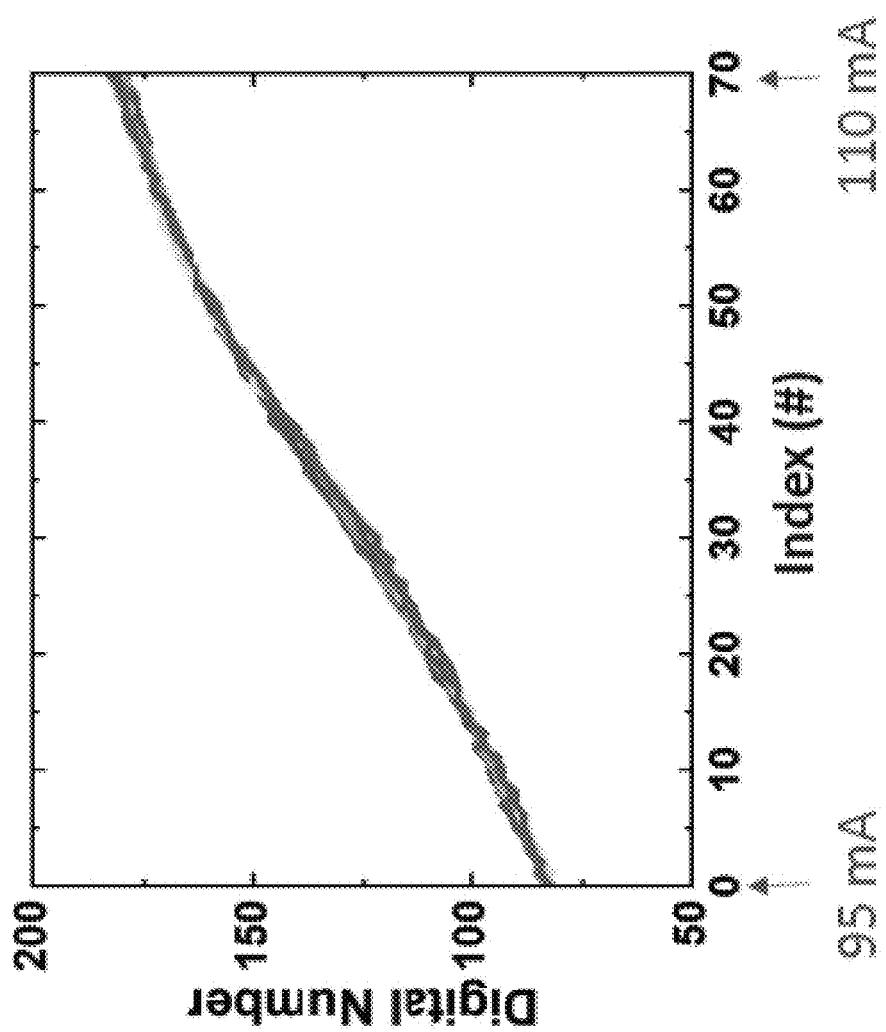
FIG. 11 illustrates the QC detector response acquired using a DAC card as a function of the QCL drive current for a fixed gap.
Figure 12:
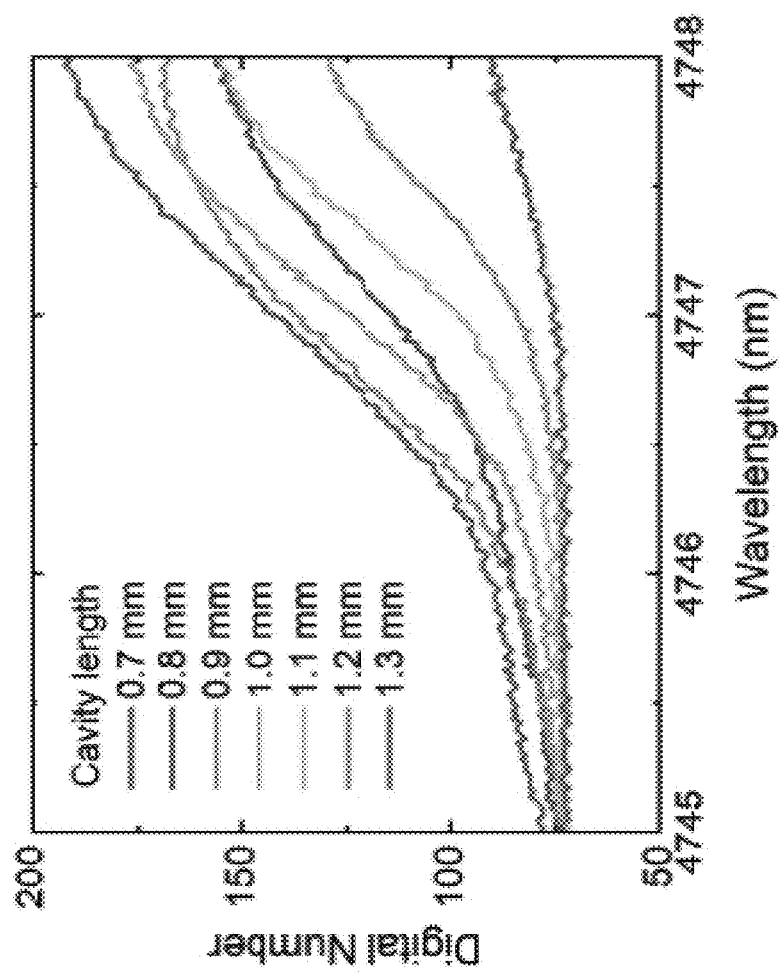
FIG. 12 illustrates the QC detector response acquired using a DAC card as a function of the QCL drive current for different QCL and QCD gaps (e.g. cavity lengths).

A laser-detector integrated test may be performed. The QC detector response as a function of the QC laser drive current was characterize. FIG. 11 illustrates the QC detector response acquired using a DAC card as a function of the QCL drive current for a fixed gap. The response intensity is a digital number, and the index number is proportional to the QCD drive current. FIG. 12 illustrates the QC detector response acquired using a DAC card as a function of the QCL drive current for different QCL and QCD gaps (e.g. cavity lengths). The drive current may be proportional to the laser wavelength.

Figure 13:
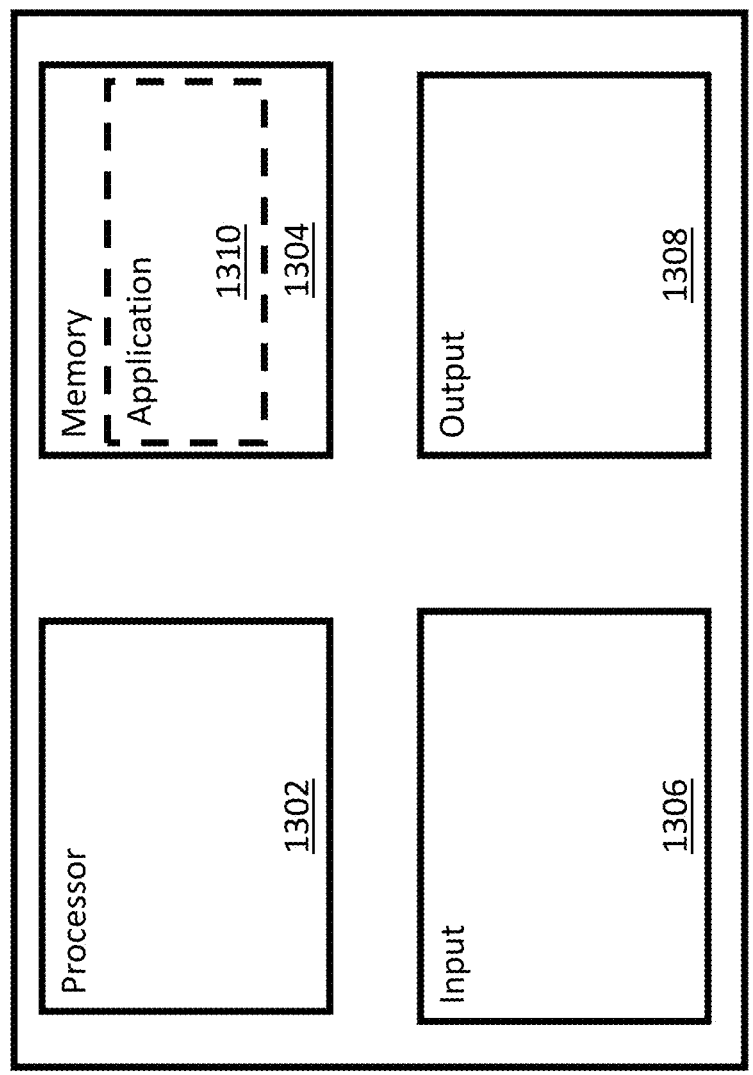
FIG. 13 illustrates a block diagram of a computer in the spectrometer described throughout in accordance with embodiments.

FIG. 13 illustrates a block diagram of a computer in the spectrometer described throughout in accordance with embodiments. The computer includes a processor 1302 in communication with memory 1304. The memory 1304 includes an application 1310 which is executable by the processor 1302 in order to receive measurements from the detector to correlate measured radiation with an amount of a substance present. The amount of substance present may be outputted through an output 1308 to another system to be used for further computations. Further, the amount of substance present, may be displayed to a user.

Figure 14:
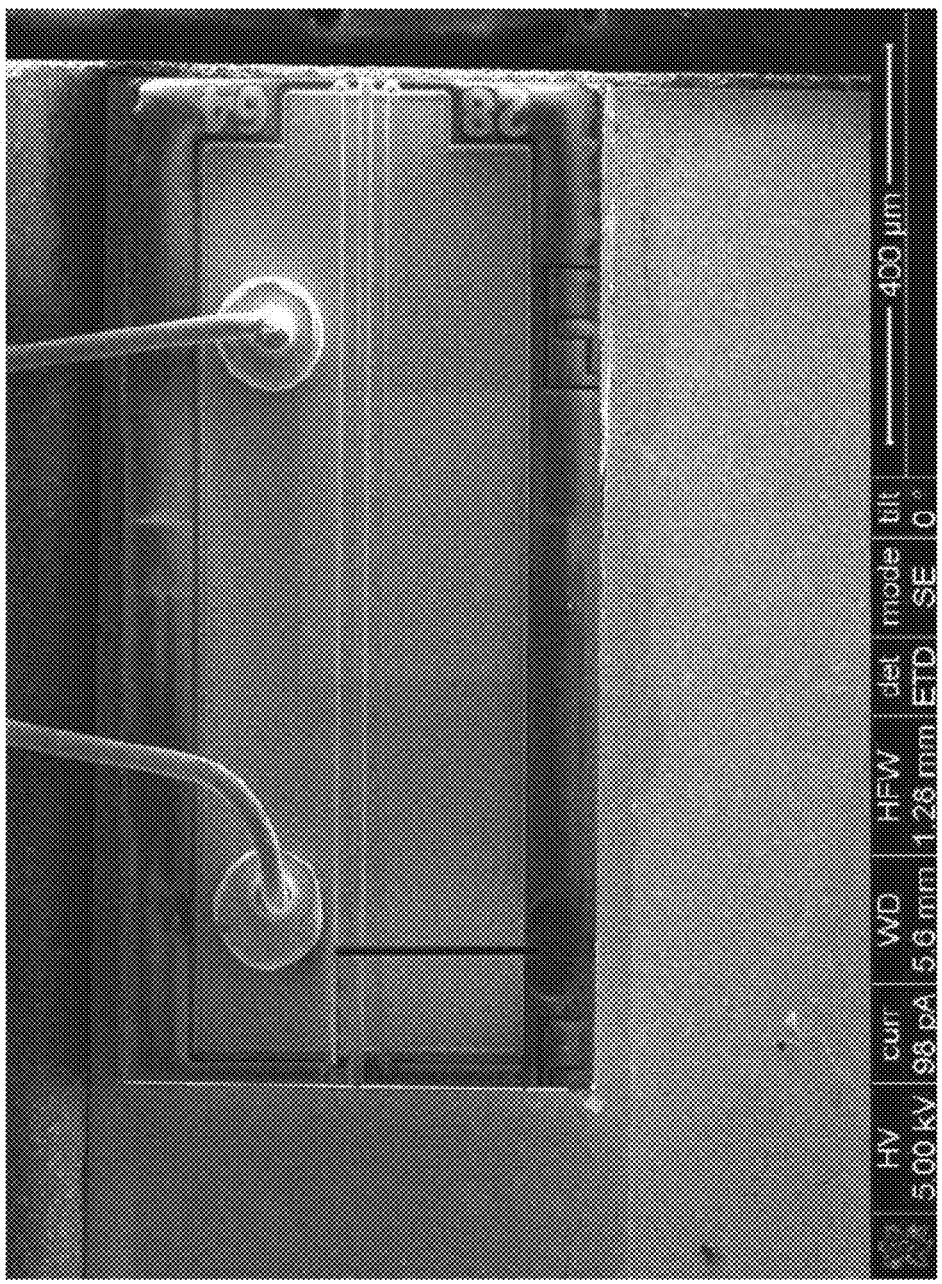
FIG. 14 is a scanning electron microscope (SEM) image of a mounted QCL with a 7 µm focused-ion beam (FIB) cut that isolates a small region into a QCD making an on-chip QCLD sensor.

FIG. 14 is a scanning electron microscope (SEM) image of a mounted QCL with a 7 μm focused-ion beam (FIB) cut that isolates a small region into a QCD making an on-chip QCLD sensor.

DOCTRINE OF EQUIVALENTS

While the above description contains many specific embodiments of the invention, these should not be construed as limitations on the scope of the invention, but rather as an example of one embodiment thereof. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A spectroscopy device comprising:
   a substrate;
   a single mode laser positioned on the substrate;
   a single mode detector positioned opposite to the single mode laser on the substrate, wherein a gap is formed between the single mode laser and the single mode detector and wherein a substance is positioned in the gap, and
   wherein the single mode laser is configured to output a tunable narrow wavelength of radiation towards the detector,
   wherein when the single mode laser outputs a wavelength of radiation overlapping one of the substance's rotational-vibrational energy levels, the substance at least partially absorbs the radiation, and
   wherein the single mode detector is configured to measure the amount of narrow wavelength radiation that is not absorbed by the substance between the single mode detector and the single mode laser.

2. The spectroscopy device of claim 1, further comprising a processor and memory with programming executable by the processor to correlate the measured radiation with an amount of the substance present.

3. The spectroscopy device of claim 1, wherein the single mode laser includes a single mode distributed-feedback (DFB) waveguide.

4. The spectroscopy device of claim 3, wherein the single mode distributed-feedback (DFB) waveguide comprising:
a semiconductor active region; and
a semiconductor cap stacked on top of the semiconductor active region, wherein semiconductor active region and semiconductor cap form a waveguide,
wherein the waveguide includes a grating structure distributed along a sidewall of the waveguide, wherein the grating structure protrudes horizontally out of a side of the waveguide.

5. The spectroscopy device of claim 4, wherein the grating structure comprises a tapered grating portion sandwiched between two uniform grating portions,
wherein each of the uniform grating portions comprise a plurality of uniform ridges with approximately identical height which laterally protrude from the waveguide, and
wherein the tapered grating portion comprises a plurality of tapered ridges which gradually increase in height from one end to an apex ridge and gradually decrease in height from the apex to the other end.

6. The spectroscopy device of claim 5, wherein the depth of ridge at the ends of the plurality of tapered ridges equals the depth of the uniform ridges.

7. The spectroscopy device of claim 5, wherein the uniform grating portions and the tapered grating portion comprises an approximately uniform grating period between the sections.

8. The spectroscopy device of claim 5, wherein the waveguide comprises another grating structure on an opposing sidewall to the sidewall which mirrors the grating structure.

9. The spectroscopy device of claim 5, wherein the waveguide comprises a surface adjacent to the sidewall including the grating structure comprising a mirrored surface, wherein the width of the mirrored surface is positioned at approximately the maximum width of the quantum cascade stack within the uniform grating portion or is positioned at approximately the minimum width of the waveguide within one of the uniform grating portions.

10. The spectroscopy device of claim 9, wherein the mirrored surface is positioned at the lowest depth portion of the grating structure within one of the uniform grating portions or is positioned at the highest depth portion of the grating structure within one of the uniform grating portions.

11. The spectroscopy device of claim 5, wherein the waveguide comprises a quantum well structure.

12. The spectroscopy device of claim 5, wherein a surface adjacent to the sidewall including the grating structure comprises a first mirrored surface and wherein another surface adjacent to the sidewall including the grating structure and opposite to the first mirrored surface comprises a second mirrored surface.

13. The spectroscopy device of claim 5, wherein each ridge within the grating structure comprise gradually increasing followed by gradually decreasing depth portions.

14. The spectroscopy device of claim 5, wherein the semiconductor active region comprises InGaAs quantum wells and AlInAs barriers.

15. The spectroscopy device of claim 5, wherein the ridges and a body portion of the waveguide share a substantially uniform thickness.

16. The spectroscopy device of claim 5, wherein the single mode laser comprises a single mode DFB laser comprising:
a semiconductor substrate with the single mode DFB waveguide positioned on the semiconductor substrate;
a dielectric layer positioned on a surface of the semiconductor substrate and positioned conformally on the grating structure; and
a metal layer contacting a portion of a top surface of the semiconductor cap.

17. The spectroscopy device of claim 16, wherein the semiconductor cap and the semiconductor substrate comprise a same semiconductor material.

18. The spectroscopy device of claim 17, wherein the semiconductor cap and the semiconductor substrate further comprise an n-type or p-type semiconductor material.

19. The spectroscopy device of claim 18, wherein the semiconductor cap and the semiconductor substrate further comprise a compound semiconductor material.

20. The spectroscopy device of claim 1, wherein the detector comprises a single mode distributed-feedback (DFB) waveguide comprising:
a semiconductor active region; and
a semiconductor cap stacked on top of the semiconductor active region, wherein semiconductor active region and semiconductor cap form a waveguide.

21. The spectroscopy device of claim 20, wherein the waveguide includes a grating structure distributed along a sidewall of the waveguide, wherein the grating structure protrudes horizontally out of a side of the waveguide.

22. The spectroscopy device of claim 21, wherein the waveguide comprises another grating structure on an opposing sidewall to the sidewall which mirrors the grating structure.

23. The spectroscopy device of claim 1, wherein the substance between the single mode detector and the single mode laser comprises CO, $CO_2$, OCS, and/or $H_2O$.

* * * * *